United States Patent Office 3,608,317
Patented Sept. 28, 1971

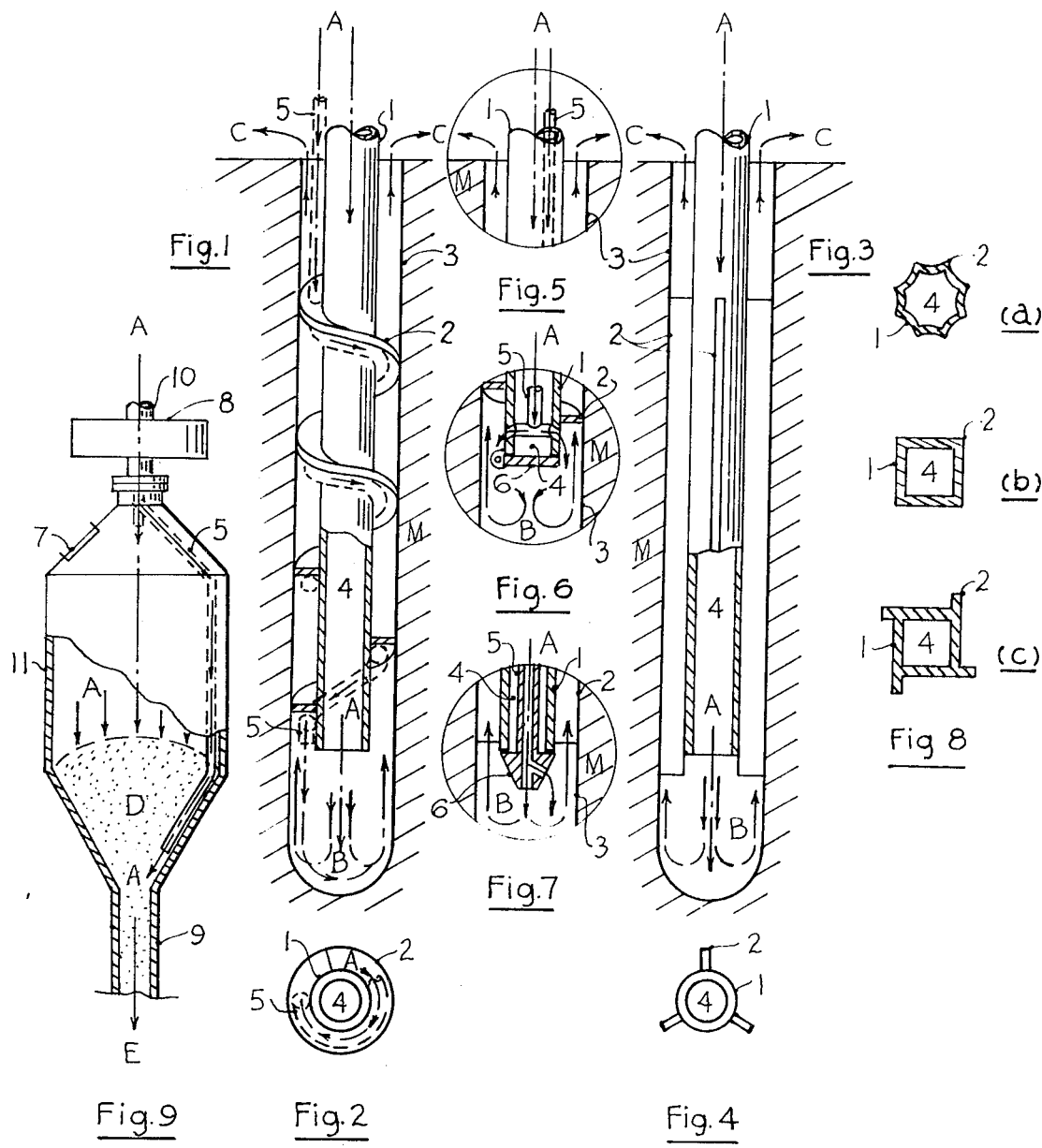

3,608,317
FORMATION AND BACKFILL OF CAVITIES IN SOIL BY JETTING
Richard E. Landau, 717 Cornwell Ave., West Hempstead, N.Y. 11552
Continuation-in-part of application Ser. No. 616,753, Feb. 13, 1967. This application Aug. 6, 1969, Ser. No. 848,113
Int. Cl. E02b 11/00; E02d 5/34
U.S. Cl. 61—11          9 Claims

ABSTRACT OF THE DISCLOSURE

Fluid jetting techniques are applied to the formation and backfill of cavities formed in material, with the invention encompassing both the method and apparatus to accomplish the indicated results. The apparatus utilizes a vaned or fluted device that permits directing a sufficiently high velocity fluid stream to be directed into the material to develope the desired cavity, with the fluid and material removed passing as effluent through the path or paths provided by the vanes or flutes. By suitably sizing the vanes or flutes, the effluent velocity can be controlled relative to the velocity of the fluid directed into the material. Where external vanes or flutes are utilized, the final shape of the formed cavity can be trimmed to conform to the dimensions of the vane or flute extremities. Where liquid is used in forming the cavity, such liquid effluent as may result from the cavity forming operation may be at least partly purged from the cavity by introducing additional fluid to displace the fluid within the cavity to the extent desired. Granular backfill material may be deposited in the cavity by using compressible fluid to maintain the flow of particles by introducing the compressible fluid in a manner so as to minimize contact between particles, thereby avoiding clogging of the flow of the granular backfill entering the cavity.

---

This is a continuation in part of U.S. patent application Ser. No. 616,753, filed Feb. 13, 1967 and now abandoned.

This invention relates to a method of forming a cavity in soil and other material, and, if desired, backfilling of the cavity to form a column of material. More particularly, the method comprises the excavation of the cavity in any plane with the aid of fluid to effect the removal of soil within the limits of the cavity, using a fluted or vaned pipe to permit the soil to leave the cavity limits by passing through the space between the vanes or flutes. The vanes or flutes, which are exterior to the pipe, may assist in forming the desired cavity by rotating the vaned or fluted pipe, with the vanes or flutes acting as cutting edges to more precisely develop the cavity dimension required. Fluid, which passes through the pipe and is directed into the soil, may be used to assist the flow of backfill material into the formed cavity. (The words "vane" and "flute" are used interchangeably.)

Jetting of cavities in soil by means of fluid, such as air and water, has been utilized heretofore using cylindrical pipe. The fluid is directed into the soil at high velocity and carries the soil out of the cavity by passing at the exterior of the jet pipe. The size of the cavity formed for a given fluid pressure and volumetric flow is not predictable as soils are normally heterogeneous and will react differently at different levels in the cavity. In order to achieve a hole of a given dimension, that dimension necessarily results as the minimum dimension of the cavity, and it can be expected that portions of the cavity will be of greater size than necessary. Inasmuch as such cavities are often for the purpose of constructing concrete piers, where concrete is the backfill material, an oversized hole is costly in terms of backfill material required. Cavities of this type may be involved in the construction of columns of material other than concrete, as in the case of sand drain formation. The formation of an oversized hole is not only uneconomical in view of the need to use excessive backfill material, but the lack of control of the excavation may result in the undercutting of the cavity, and may result in soil collapse within the cavity. Such undercutting and collapse may effect soil disturbance, which is particularly undesirable in sand drain construction, but may also effect the safety of any adjacent property. To avoid such problems, jetting of soil in connection with cavity formation is sometimes performed in conjunction with a pipe or casing, where the jetting of the soil within the limits of the casing diameter permits the casing to sink into the soil either under its own weight or with a minimum amount of force applied to the casing or pipe, and the fluid soil mixture passes out of the formed cavity through the interior of the casing. This latter system uses a jet pipe and an outer pipe or casing. Another system in use involves the initial driving of the casing to the depth desired and the subsequent cleaning of the soil from within the casing by means of fluid jetting. Although the casing or pipe provides a support for the soil cavity, such support is usually not necessary after the cavity is backfilled, and it is generally expedient to remove the casing from the soil to permit its use in the formation of additional cavities.

It is therefore evident that the jetting of a cavity does not result in the production of a hole of predictable dimension where the jetting operation is not confined to the interior of a pipe or casing. Without confinement of the jetting fluid within the limits of the casing, the fluid and the excavated soil will necessarily form an exit passage between the pipe and the surrounding soil. Depending upon the resistance of the soil to the eroding effects of such flow, the final cavity dimension will vary. To minimize the size of the cavity formed by scour or erosion when flow passes between the pipe and the surrounding soil, the velocity of the flow must also be minimized, which in turn involves minimizing the allowable jet velocity. Such reduction in flow results in an inefficient jetting operation, and in cohesive soils low velocities may not be effective.

The formation of the cavity below the jet nozzle is initially related to the pressure of the fluid as it is forced through the nozzle. Such pressure reflects as a velocity of the jet stream when it leaves the nozzle. The velocity of the stream impinges upon the soil below the nozzle. The more cohesive the soil or the heavier the particle size the higher the velocity required to form the cavity. The jet effluent in travelling to the ground surface attains a velocity related to the volume of the fluid flowing and the cross-sectional area between the outside of the jet pipe and the cavity periphery. The diameter of the cavity periphery at any level will stabilize to develop an area sufficient to accommodate the volume of effluent flow at a velocity which will not erode the soil. In cohesionless soils, the maximum velocity that can be maintained without erosion can be established by Stokes's law; in which instance the stable area at any level would be the volume of effluent flow divided by the velocity obtained by Stokes's law. For a given type of material, the limiting velocity is proportional to the square of the particle size. Thus, fine grained cohesionless soils will be eroded to a greater extent than coarser grained soils for a given volume of effluent flow. Where the fine grained soil underlies the coarser material, the larger area which must develop in the fine grained soil will undercut the coarse grained soil which will in turn either collapse to a lower level, or develop distortions due to loss of underlying support. In the case of cohesive soils, limiting velocities are higher than for the cohesionless soils of the same particle size. Nevertheless, such higher velocities must be attained to jet through such soils; and similarly, undercutting can result with disturbing effects to overlying soils, including the formation of holes of irregular shape. Because the subsoil is not supported by the jet, as the hole is larger than the jet pipe forming it, it is necessary to maintain water flow in order to maintain a velocity of flow to prevent collapse into the space between the jet pipe and the periphery of the cavity at any level. If a finer grained soil is encountered at a lower level, and the velocity of flow is reduced to prevent undercutting, then the hole in the coarser overlying material will not sustain itself and may collapse. Thus, it is often impractical to use a flow variation in the development of a substantially constant diameter cavity in stratified soils. To develop a cavity of uniform dimension by jetting would require a degree of knowledge of soil types encountered which cannot be obtained with any degree of competence by present day investigative techniques. Further, the degree of control over the jet velocity which would be required to produce a constant cavity diameter, if such were possible, is not available in present day equipment as there is no practical way to tell in advance the limiting flow required to produce a hole of specific size. In practice, a great deal of emphasis is placed on jetting pressure, which relates to velocity of flow. Whereas it is common to use 100 to 150 p.s.i. in jetting through gravel, only 40 to 60 p.s.i. is recommended for sand. For cohesionless silt the pressure would be proportionately less. In cohesive soils, such as clay, jetting may be found difficult and in instances may not be practicable. Also, because of the flow and jetting pressure required to penetrate into soil, it is difficult to align the jet and hold it so that it travels in a given path below ground where directional control cannot be applied readily. Where jets are used in the installation of sand drains spaced from 6' to 20' or more on centers, the use of high pressure jets has often resulted in a "blow" occurring, where the water from a hole being jetted finds its way to a previously completed sand drain as a path of least resistance to the ground surface.

Although the use of jetting techniques are most often applied to the formation of cavities in soil, such cavities may be formed in rock and solid materials of various types, by use of proper jet fluid. The fluid can include abrasive particles; the fluid can involve chemical solutions such as hydrochloric acid which reacts with limerock to break down its solid matrix making it more readily penetrable; and in general the fluid and its components can be matched to the material in which the cavity is to be formed.

The accompanying drawing, showing FIG. 1 through FIG. 9, presents possible means for practicing the invention; however, the drawing is not to be construed as limiting the practice of the invention to the means illustrated.

FIG. 1 is a view of one type of jetting apparatus, showing the cavity 3, formed in material M. The jetting fluid A, may be introduced through shaft 1, or pipe 5, the vaned or fluted apparatus. Material M is jelled by fluid A, to form a mixture B, which is displaced from the excavation limits 3, as an effluent C. One possible location of pipe 5 is presented in dashed lines, in which instance the use of a cap 6, such as shown in FIG. 6, would be desirable.

FIG. 2 is a bottom view of the apparatus of FIG. 1.

FIG. 3 is a view of another type of jetting apparatus that can be used in cavity formation, similar to the method described for FIG. 1.

FIG. 4 is a bottom view of the apparatus of FIG. 3.

FIG. 5 is a view showing two of the possible means for introducing jetting fluid to the lower end of the cavity forming apparatus. The fluid A, can be introduced through the shaft 1, of the apparatus as well as through a separate inlet pipe 5. The pipe 5, can be located inside and outside of the shaft 1.

FIG. 6 is a view of the lower end of an apparatus utilizing a cap 6, with the jetting fluid A, passing into the cavity area through the side of the apparatus shaft 1.

FIG. 7 is a view of the lower end of an apparatus utilizing a cap 6, with the jetting fluid A, passing into the cavity area through the cap 6.

FIG. 8 shows the configuration of three of the many possible shapes that may be used as sections for the apparatus employed to to practice the present invention. Section (a) is an eight sided shape, having a hollow center 4. Section (b) is a four sided shape, with a hollow center 4. Section (c) is a four sided shape, with projections, and having a hollow center 4. Where an inlet pipe 5, FIG. 1 is located at the exterior of shaft 1, the hollow center 4, may not be needed in cavity formation.

FIG. 9 shows a section of an apparatus 11, which utilizes jetting fluid A, to cause the movement of backfill material D, through conduit 9. The jetting fluid A, used for the purpose of cavity backfill, need not be the same as used in cavity formation. By joining conduit 9, with shaft 1, of the cavity forming means, an apparatus may be formed which is capable of both cavity formation and backfill by jetting means. It is noted that the apparatus may be held by attachment to shaft 10, and rotated if desired by means of drive 8. The backfill material D, may be introduced through portal 7, which is opened as needed for access to the interior of apparatus 11. The material leaving the apparatus 11, is a combination of jetting fluid A, and backfill material D, which is shown in FIG. 9 as the mixture E.

It is noted that the apparatus in FIG. 1 need not be rotated in order for the edge of the vanes or flutes 2, to trim the periphery of the cavity excavation 3, as the axial motion of the apparatus in the direction of excavation will effect any needed trimming due to the helical configuration of the vanes 2. Where entirely axial vanes or flutes 2, are used, as in FIG. 3, if trimming of the cavity periphery 3, is needed rotation of the vaned or fluted apparatus will be required. It is noted that the extent and length of the vanes or flutes 2, and the degree of skew to the axis of shaft 1, of the apparatus may be varied to achieve any desired trimming action related to the axial advance or rotation of the apparatus. Other forms of the apparatus, details of design, and other configurations of vanes or flutes, will be evident to those familiar in the art.

It will at once be evident that the use of present day jetting techniques in the formation of cavities of a given size cannot be applied in soil as a practical matter. I have found a substantially improved method of forming cavities in all types of soil by jetting, which results in a cavity of substantially controlled dimension, which can be filled with column forming material without exposing such backfill to contamination from effluent remaining in the cavity, and at the same time avoiding the use of external casing. The method involves the use of a vaned or fluted pipe, wherein the fluid (such as air, water, or other) is passed through the pipe and directed into the soil. The support of the formed cavity is maintained substantially by the outer dimensions of the vanes or flutes, and the soil bearing effluent passes between the vanes or flutes to the upper level of the cavity and to the surface disposal point. The support provided the cavity by the flutes and vanes, minimizes the volume of fluid required as cavity support. By rotating the vaned or fluted jet pipe, simultaneously with jetting or otherwise such that the vanes or flutes act as cutters, the final cavity dimension can be developed thereby minimizing the jetting pressure needed to form the cavity. The size of the pipe, volume of fluid flow, and the spacing of vanes or flutes may be varied to develop the desired high velocity at the jet end of the pipe while maintaining a low velocity of flow in passing through the vanes or flutes so as to avoid eroding and undercutting the periphery of the formed cavity. The disposition of the vanes or flutes can be vertical, helical, or otherwise shaped or formed along the exterior of the pipe to permit a substantially controlled effluent velocity.

The passage of fluid under pressure through the lower end of the pipe will prevent the intrusion of soil, and in this manner, if desired, the vaned or fluted pipe can be constructed without a cap at its lower end. In addition, the jets may be directed downward, sideward, or in any direction depending upon the characteristics of the soils involved and the specific dimensions of the vaned or fluted pipe employed with respect to the cavity size involved. The vanes or flutes can be disposed axially along the pipe, helically around the pipe, placed continuously or intermittently along the pipe, and if desired, where the formed cavity can be supported by the fluid passing to the disposal point, or where the cavity is otherwise self supporting, the vanes or flutes need not extend for the full length of the pipe. The vanes or flutes provide a controlled flow path for the jetting fluid effluent.

In augering holes of great depth by means of a flight auger, such flights may become clogged with soil so as to reduce its cutting efficiency. In such cases, the cavity may be partially formed with the assistance of fluid jetting. In using a hollow shaft auger with a cap, the jet pipe can be arranged interior to the hollow shaft in a suitable manner, or the hollow shaft itself can be used as the jet pipe, with the auger flights being the flutes. A form of cap which may be suitable for this purpose is shown in U.S. Pat. 193,348. Other forms of caps will be evident to those familiar with the art. After the cavity is formed, the backfill material can be placed through the vaned or fluted pipe by jetting backfill means. Such preferred means involves the use of a compressible fluid when the backfill is granular, such as when sand is involved. By directing a jet of compressible fluid, such as air, into the granular material in a manner that the material becomes dispersed, the particles affected become dispersed in the fluid and tend to flow with the fluid. The pressure within the fluid keeps the particles separated, thereby minimizing intergranular pressure, and avoiding clogging of the pipe through which the backfill is passed into the cavity. Apparatus for the use of air in the backfill operation is described in U.S. patent application Ser. No. 246,411, which involves the use of a hopper containing a supply of backfill material and a fluid jet supply means for dispersing the backfill material so as to cause it to flow through a hollow shaft or conduit disposed above or within the cavity limits, for passing the material into a formed cavity. If desired, viscous fluid, such as water, may be used to convey backfill material into the cavity in substantially the same manner that gaseous fluid, such as air, is used.

In instances where a liquid is used as the jetting fluid, and it is desired that the backfill material not have contact with the liquid that may remain within the fluted pipe, the liquid may be purged from the fluted pipe by an acceptable fluid pressure, such as air applied under pressure. By use of sufficient air under pressure, the external flutes may be purged of any contaminated liquid as well. The backfill operation may then be performed without incurring undesirable contamination. Flowable backfill material, such as mortor mixtures, can be pumped through the fluted pipe into the cavity. The backfill of the cavity is preferred to be performed simultaneously with the removal of the fluted pipe from the soil; however, in self-sustaining soil cavities such backfill may be performed subsequent to the removal of the vaned or fluted pipe from the soil. In instances where the fluid used is left in the soil to support the cavity, the backfill can be placed subsequent to the removal of the fluted or vaned pipe. Cavities formed in solids can likewise be backfilled subsequent to the removal of the cavity forming tool.

Although certain particular embodiments of the invention are herein disclosed for purposes of explanation, further modifications thereof, after study of the specification, will be apparent to those skilled in the art. Reference should accordingly be had to the appended claims in determining the scope of the invention.

What is claimed and desired to be secured by Letters Patent is:

1. A method of forming a cavity in material comprising penetrating into the material to the desired depth by passing fluid under pressure through a pipe, which is part of a cavity forming tool having external vanes or flutes, at a rate sufficient to cause the formation of at least a portion of said cavity at substantially the point of injection of such fluid into said material by virtue of the action of said fluid cutting into said material and conveying at least at portion of said cut material to the surface through the path formed by said vanes or flutes.

2. The method of claim 1 wherein the vanes or flutes extend for substantially the full length of the formed cavity.

3. The method of claim 1 wherein the fluid contains at least one coactive chemical in solution to expedite cavity formation by reacting with the material in a manner so as to enable the vaned or fluted pipe to penetrate said material more readily.

4. The method of claim 1 wherein the cavity forming fluid retained within the limits of the formed cavity is at least partly purged from the cavity by the application of a second fluid under pressure.

5. The method of claim 4 wherein the cavity forming fluid is liquid, and at least a portion of said liquid retained within the limits of the formed cavity is substantially purged by the use of air under pressure.

6. The method of claim 1 wherein said cavity is formed at least in part by the rotation of said vaned or fluted pipe.

7. The method of claim 6 wherein the rotation of said vaned or fluted pipe is accomplished substantially simultaneously with the passage of fluid through the pipe to form said cavity.

8. The method of claim 1 wherein at least portion of said cavity formed by said fluid is augmented by cutting the material with the vaned or fluted cavity forming tool.

9. The method of claim 1 which incorporates a system for backfilling said cavity by flowing granular backfill material through the shaft of said cavity forming tool, using flow of a second fluid directed into said backfill material at a level below the top of said backfill material so as to disperse said backfill material into said second fluid thereby enabling said backfill to flow through said shaft into said formed cavity.

References Cited
UNITED STATES PATENTS

| | | | |
|---|---|---|---|
| 2,920,455 | 1/1960 | Ryser et al. | 61—53.64 |
| 3,188,817 | 6/1965 | Myers | 61—53.64 |
| 3,255,592 | 6/1966 | Moor | 61—63X |
| 3,300,988 | 1/1967 | Phares | 61—63 |

FOREIGN PATENTS

| | | | |
|---|---|---|---|
| 882,085 | 11/1961 | Great Britain | 61—53.64 |

JACOB SHAPIRO, Primary Examiner

U.S. Cl. X.R.

61—35, 53.64, 63; 175—65, 394